United States Patent [19]

Plessers et al.

[11] 4,393,642

[45] Jul. 19, 1983

[54] SHEET RECEIVING AND STORAGE APPARATUS

[75] Inventors: Hendrik S. Plessers, Wychmaal; Julianus J. Hellemans, Kontich, both of Belgium

[73] Assignee: Agfa-Gevaert N.V., Mortsel, Belgium

[21] Appl. No.: 251,335

[22] Filed: Apr. 6, 1981

[30] Foreign Application Priority Data

Apr. 9, 1980 [GB] United Kingdom ............... 8011695

[51] Int. Cl.³ .................. B65B 5/06; B65B 5/10; B65B 7/00
[52] U.S. Cl. .................. 53/266 R; 271/207; 271/314; 414/46; 414/404
[58] Field of Search ............ 271/207, 214, 215, 314, 271/3.1, 212, 220, 223, 224; 53/266 R, 266 C, 520; 414/403, 404, 46, 107, 414, 332

[56] References Cited

U.S. PATENT DOCUMENTS

| | | | |
|---|---|---|---|
| 2,595,346 | 5/1952 | Federwitz | 271/212 X |
| 3,704,793 | 12/1972 | Nicol et al. | 271/207 X |
| 4,230,312 | 10/1980 | Templeton | 271/215 |
| 4,338,522 | 7/1982 | Stievenart et al. | 271/3.1 X |
| 4,342,325 | 8/1982 | Lundblad | 271/3.1 X |

*Primary Examiner*—Bruce H. Stoner, Jr.
*Attorney, Agent, or Firm*—William J. Daniel

[57] ABSTRACT

A sheet receiving and storage apparatus comprises a housing and an open-bottomed magazine releasably connected therewith for collecting sheets introduced therein through its open bottom. The sheets after being partially introduced into the magazine are intercepted along their lower edges by a support located below the entrance opening of the magazine. When a predetermined amount of sheets are stacked thereon the support and sheet stack are bodily raised, so that the stack of sheets moves entirely into the magazine. The sheet stack is then retained in the magazine with the help of a stack retaining element, after which the support is lowered and a light-trap associated with the magazine is actuated to light-tightly close the magazine. Then, the magazine may be taken out of the apparatus.

14 Claims, 7 Drawing Figures

SHEET RECEIVING AND STORAGE APPARATUS

FIELD OF THE INVENTION

This invention is concerned with sheet receiving and storage apparatus which may find use in the field of radiography as part of systems suited for the manipulation of radiographic films in daylight.

BACKGROUND OF THE INVENTION

In recent years, the manipulation of radiographic cassettes in daylight has undergone a real breakthrough in that apparatus have been devised and marketed which enable radiographic cassettes to be loaded and unloaded in daylight conditions. A key-element in some of such radiographic systems is a so-called intermediate unloader and associated storage facility by means of which exposed radiographic film sheets are unloaded from cassettes and temporarily stored preparatory to being fed into a radiographic film processing apparatus. Such an intermediate facility is useful e.g. in medical radiographic departments in which a series of sequential examinations of one or more patients needs often to be performed. The individual exposures are sequentially delivered to the storage facility which comprises a removable magazine. The storage magazine is subsequently transferred, in light-tight closed condition, from the loader to an unloader associated with a processing apparatus wherein the films unloaded from the intermediate storage magazine are processed in the same sequence.

Some of the prior art intermediate storage facilities are of the type comprising a so-called roller-magazine comprising a light-tight housing which has a screenable slot through which the exposed film sheets enter the housing from the cassette unloader and which contains a film-guiding web having its ends connected to rotatable cores. Film sheets entering the housing become positioned upon this web and are carried along thereby as it is wound from one core to the other. Consequently the films become sandwiched between adjacent convolutions of the web. When the film sheets are to be dispensed from the magazine to a processing apparatus the direction of rotation of the cores is reversed and films are delivered from the entrance slot of the magazine towards transporting rollers at the inlet of the processing apparatus.

It will be evident that such roller-type magazines suffer from the disadvantage that the film sheets are delivered from the magazine in the reversed order from that in which they were fed into it. For some radiographic techniques in which e.g. use is made of contrast enhancing fluids (for example in the gastro-intestinal field) or when motion studies are carried out, the preservation of the correct sequence may be of great importance.

Another type of intermediate unloader is disclosed in our U.S. Pat. No. 4,338,522 issued July 6, 1982 in which a radiographic cassette unloader is disclosed having twin storage magazines. One magazine receives exposed film sheets from the unloader and the other magazine is coupled to a dispenser from which exposed film sheets are dispensed one by one for processing. The interiors of the two magazines are separated by walls which are displaceable to enable film sheets accumulated in the first magazine to be transferred to the second and after such transfer these walls can be closed to enable feeding of sheets into the first magazine and dispensing of sheets from the second to continue simultaneously. The first magazine can be removed from the unloader and taken to a different sheet dispensing site but the magazine when removed is not light-tight and the transfer cannot be effected in daylight.

Also, due to the manipulation to be carried out, mistakes of human nature cannot be fully excluded and the coupling stage itself is rather complicated.

OBJECTS OF THE INVENTION

It is therefore an object of the invention to provide a sheet receiving and storage apparatus which is simple to operate and which is free of the inconveniences of prior art devices.

GENERAL SUMMARY OF THE INVENTION

According to the present invention, there is provided: A sheet-receiving and storage apparatus comprising a housing having an entrance opening via which sheets can be fed one by one into the interior of the housing, an open-bottomed magazine releasably connected at its bottom to the housing for receiving sheets from the housing in the same sequence and storing them as a stack, a sheet advancing mechanism for causing sheets entering said housing to advance into a rest position in which their leading portions intrude into said magazine, sheet supporting means which is adapted to occupy a lower position for underlying the trailing edges of a plurality of said sheets after their sequential advance by said sheet advancing mechanism and thereby supporting such plurality of sheets in face to face relationship in said rest position, a mechanism for displacing said sheet supporting means from that lower position to a higher position thereby to raise the supported sheets fully into the magazine, retaining means operative for retaining the raised sheets in the magazine against the action of gravity after retraction of said sheet supporting means from the magazine, and closing means for light-tightly closing the bottom of said magazine after that retraction.

Apparatus according to the invention as above defined requires only one magazine. This magazine can be of any required size for accommodating the required number and format of sheets. When the number of sheets which it is desired to load into the magazine has been collected in the housing, the sheet supporting means is raised into the magazine and the retaining means is operated to prevent the sheets from falling when the support is lowered. After descent of the support out of the magazine, the bottom of the magazine is light-tightly closed and the magazine can then be removed from the housing and taken to any required place for unloading. The sheets can be dispensed from the magazine one by one, in the same order in which they are introduced into the sheet-receiving and storage apparatus. The dispensing of the sheets from the magazine can be effected e.g. by dispensing apparatus as described in our aforesaid U.S. Pat. No. 4,338,522.

A sheet-receiving and storage apparatus according to the invention can be used in conjunction with a cassette unloading apparatus which operates to unlock and open radiographic cassettes and to advance the exposed film sheets to be displaced from the cassettes to a take-up point. The film sheets can be transferred by such an apparatus directly into the entrance opening of the housing of the sheet-receiving part of the apparatus according to the invention. Suitable cassette unloading apparatus for use in that manner are described in our U.S. patent mentioned hereinbefore and in U.S. Pat. No. 4,329,589 issued May 11, 1982.

Preferably the apparatus according to the invention includes a sequence control means which ensures that the sheet suporting means cannot be lowered from its raised position until the sheet retaining means has been moved into sheet retaining position.

In certain embodiments of the invention there is safety means by which the magazine is locked to the housing so long as the light-tight closure is in its "magazine open" position.

The light-tight closure means for the magazine may comprise a member which has a slot through which the film sheets and the sheet supporting means can pass when the said member is in one position and which is rotatable from that one position (the "magazine open position") into another position (the "magazine closed position") in which that member light-tightly closes the magazine. Such closure member may e.g. be in the form of an axially slotted roller which is rotatable through 90° from one of these positions into the other.

The sheet retaining means may comprise one or more finger or blade elements projecting radially from a shaft which is rotatable for moving each such element towards and away from the stack of sheets in the magazine. Such elements may be flexible. In order to avoid risk of damage to a sheet, it is in any case preferable for the sheet-contacting ends of each such element to be made of or surfaced with a fairly soft elastically deformable material e.g. silicone rubber.

Apparatus according to the invention may include means for detecting the presence of a predetermined number of sheets on the sheet supporting means. Such detecting means may comprise a spring-biased sensor which bears temporarily against the stack fo sheets on the support and which is moved into a predetermined limit position by the arrival of the last of a predetermined number of sheets on the sheet support. The sensor may automatically control the sheet feeding mechanism so that the movement of the sensor into that limit position terminates the feed of sheets into the housing of the sheet receiving and storage apparatus and/or the said sensor may actuate an indicating signal which brings the "full" condition of the sheet support to the attention of an operator. The spring-biased sensor may for example reflect or intercept radiation emitted by a radiator so as to influence the response of a radiation-sensitive detector. If the sheet-receiving and storage apparatus is to be used for handling sheet material which is sensitive to visible light, the radiation used in the detecting means should be infrared radiation.

In another preferred embodiment, the sheet advancing means is in the form of a pair of transport rollers, one of which rotating towards and closely positioned to the sheet suporting means.

As a consequence, a sheet which is released by the pair of transport rollers becomes supported on the periphery of the rotating roller and is gradually transferred towards the sheet supporting means. By the fact that the transport roller in question is either continuously rotating or, if intermittent, is timed to continue rotating during a certain period of time after release of the sheet, it exerts a constantly urging force upon the sheet after the latter has become supported. In so doing, it is possible to build-up a stack of sheets on the sheet supporting means as the force exerted on the sheet by the transport roller, due to the characteristics of its surface, is of a higher magnitude than the mutual friction between the sheets of the stack. So, shifting of a sheet by the transport roller can serve to displace the sheets already resting on the sheet supporting means.

An example of the apparatus according to the invention will be described hereinafter with reference to the accompanying drawings, in which:

BRIEF DESCRIPTION OF THE DRAWINGS

FIG. 4 shows a system for detecting the presence of a predetermined number of film sheets.

DETAILED DESCRIPTION OF ILLUSTRATIVE EMBODIMENT

Figure 1:
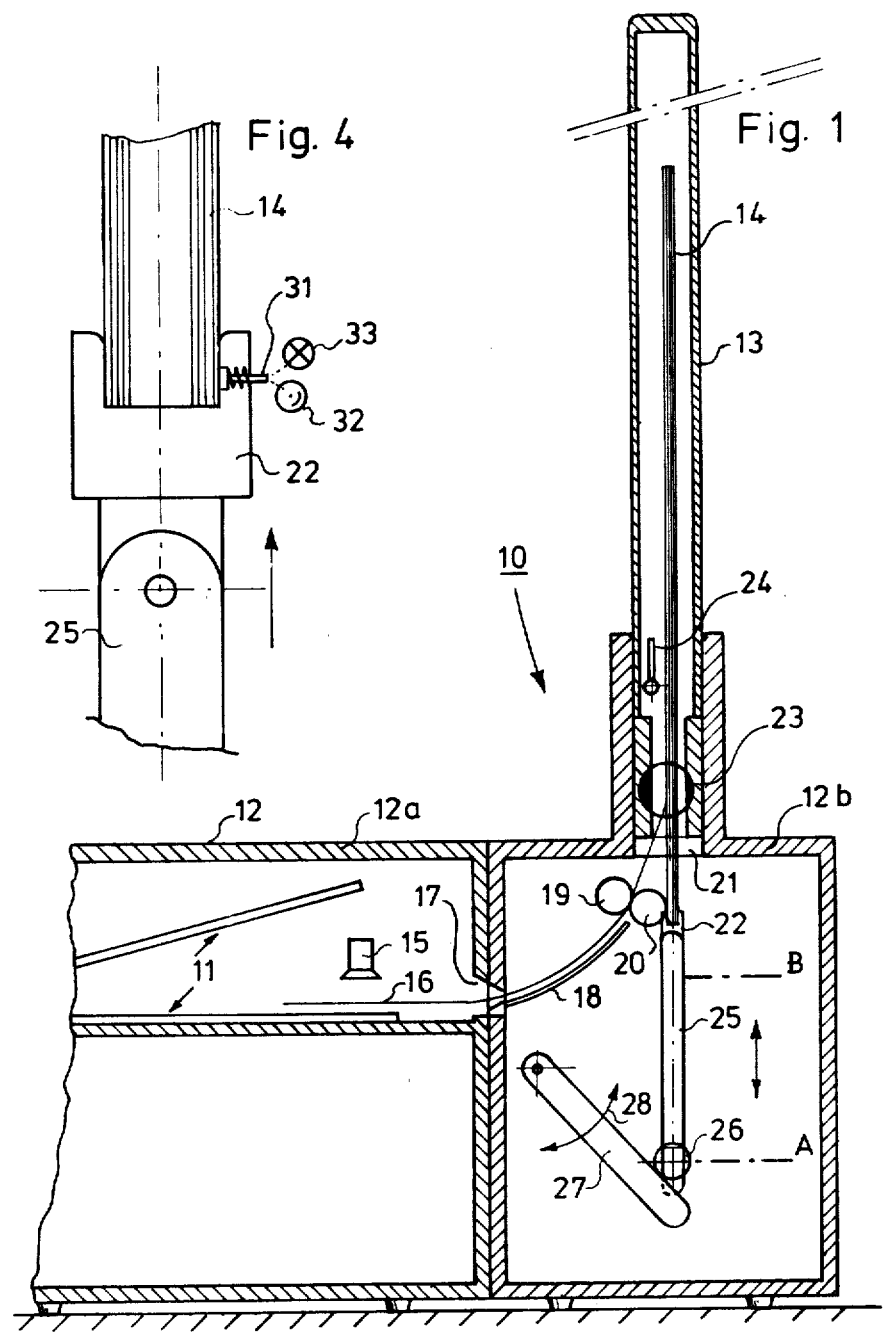
FIG. 1 is a sectional view of a portion of an intermediate unloader for radiographic cassettes in association with an apparatus according to the invention.

As may be understood from FIG. 1, a sheet-receiving and storage apparatus 10 for radiographic film cassettes 11 comprises a housing 12b which may be light-tightly closed and from which protrudes magazine 13 in which a stack of radiographic films 14 may be housed.

The housing 12b may be linked with a module 12a in a light-tight fashion.

So, in module 12a which may be called the unloading module, are housed means, not shown, for positioning, unlocking and opening the radiographic cassette 11. Devices by which this cycle of manipulations may be carried out automatically are described in our U.S. Pat. Nos. 4,338,522 and 4,329,589, both already mentioned hereinbefore, and needs therefore no further description. After the radiographic cassette 11 is properly opened, film dispensing means—here represented by a sucker-cup 15 which may be subjected to a sequence of movements (not represented)—takes the film 16 out of the cassette 11 and guides it via slot 17 into module 12b which is part of the sheet receiving and storage device according to the invention.

The sucker cup 15 takes the film 16 out of the cassette 11 at a distance spaced from the leading edge of the film which is sufficiently long as to permit the leading edge of the film to be fed via guide plate 18 to the nip of transport rollers 19,20.

Due to the angled orientation of the latter, the film 16 is guided into magazine 13 via entrance opening 21. When leaving the nip between transport rollers 19,20 the trailing edge of the film 16 remains supported on the periphery of rotating transport roller 20. As a consequence, it is gradually displaced towards a recessed support 22 lying closely adjacent to the periphery of roller 20 as well as the entrance opening 21 of magazine 13. Due to the nature of the surface of the rotating transport roller 20, which is covered with a sleeve of e.g. rubber the rotating roller exerts a driving force upon the film 16 which is of such a magnitude that it overcomes the mutual friction between the films in the stack 14. As a consequence, the latter are gradually shifted (towards the right on FIG. 1). It will be clear that in order to perform this shifting action, roller 20 must either continuously rotate or be controlled in such a way that its rotation continues for a certain period of time after release of the film 16 by the transport roller pair 19,20.

It will be appreciated that when a number of radiographic cassettes 11 are unloaded in sequence, a stack 14 of films is collected. The pushing action exerted by the surface of the rotating transport roller 20 guarantees that the trailing edge of the films 16 constituting the stack 14 is reproducibly guided into the recess of support 22.

As the films 16 are fed from the left to the right (as seen in FIG. 1) the one which was dispensed first occupies the extreme right position in the stack. Support 22 is linked with a bar 25, which itself holds a roller 26. The roller 26 is in turn supported by a bar 27 that is pivoted for oscillating movement according to the arrow 28. Rocking bar 27 in an upward direction, either by hand or with the help of a motor lifts roller 26, bar 25 and support 22 correspondingly. The limits of the reciprocation movement that roller 26 is capable of undergoing denoted A and B, are such that the support 22 and consequently the stack 14 may be displaced into and out of the magazine 13 via light-trap 23. The light-trap 23 (described more fully later) is in the form of a cylinder penetrated by a radial slot having dimensions corresponding with a thickness of the number of film sheets, say 25 of the maximum format commonly used in radiology.

Inside the magazine 13, there is a film retaining element 24 serving to press the stack of films 14, when completely within magazine, against the right side wall of the latter so that the stack 14 is prevented from sliding out again. After the film retaining step, the support 22 is returned to its downmost position while the stack remains in the magazine 13. Then, the light-trap 23 is rotated over 90° thereby light-tightly screening off the entrance opening 21 of the magazine 13.

Subsequently the magazine 13, with its light-trap 23 closed and containing the stack 14 of radiographic films immobilized by film retaining element 24 is brought to an unloader (not shown) having a film separating and dispensing mechanism permiting the sequential unloading of the magazine 13 into a processing machine or another film treating device.

Figure 2:
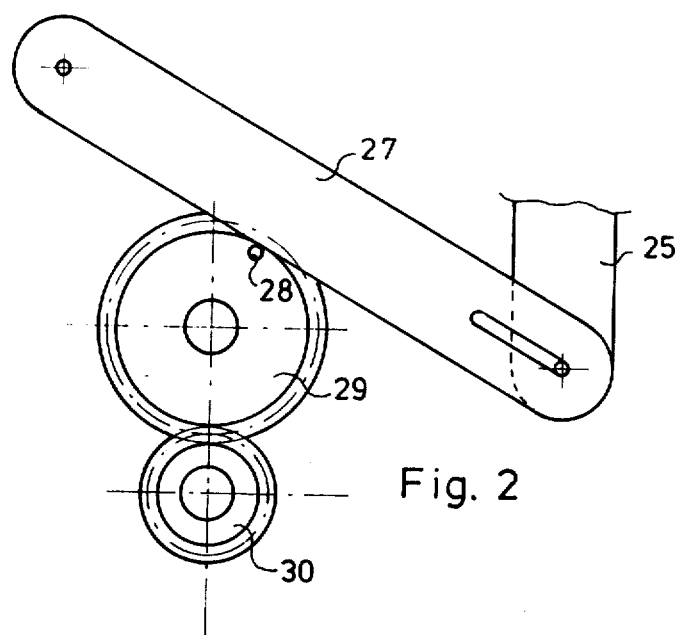
FIGS. 2 and 3 are details of the device of FIG. 1.

The roller 26 may, if desired, be omited and the bar 25 hingedly and slidingly connected with bar 27, as shown in FIG. 2.

In FIG. 2 is also illustrated how oscillation may be imparted mechanically to the bar 27 in order to cause the lifting of the bar 25.

As may be seen, the bar 27 rests with one edge upon a pin 28 located near the periphery of a gear 29 which is rotated via an intermeshing gear 30 driven by a motor (not shown). Rotation of gears 29 and 30 makes the pin 28 perform a circular trajectory. Bar 27 remains in contact with the pin 28 and thus has an up-and-down movement imparted to it. This up-and-down movement is transmitted to bar 25 by bar 27.

Figure 3:
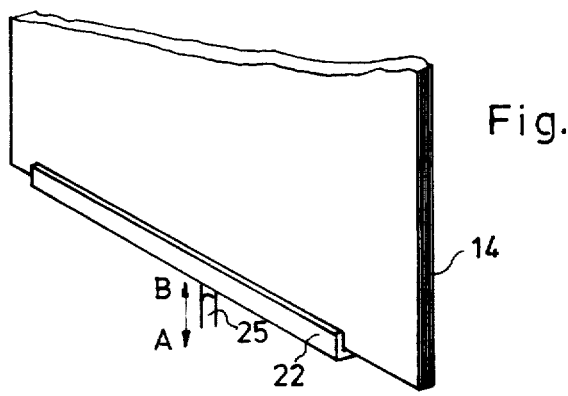

FIG. 3 shows one embodiment of the support 22 in operative position holding the stack 14. Support 22 may be in the form of a bar provided with a longitudinally extending recess or channel which is sufficiently wide to embrace the lower edge of a stack 14 of about 25 radiographic films. When that number of films is received on and held by the support, detecting means (as described further) stop the further feeding of films.

It will be clear that the support 22 is not necessarily in the form of one single unit but may also be in the form of a row of smaller supports fixed to one common carrier.

As already mentioned hereinbefore, the support 22 is provided with detecting means which limits the maximum number of films which can be present in the recessed portion of the support. These detecting means have to control automatically the stopping of the further feeding of radiographic films towards the magazine once the latter is filled (hereinafter explained further). The mechanism for lifting the stack into the magazine needs also to be capable of being energized at will, e.g. after taking a particular series of radiographs of a subject fewer than the set maximum.

In FIG. 4, one type of detecting means are illustrated. They are provided partly inside and partly outside and close to the support 22. The right-hand side of the support 22 is provided with an aperture in which a spring biased pin 31 fits. Pin 31 is progressively shifted to the right by the incoming film sheets, so that as soon as the maximum number of films are supported in the recess of support 22, its inside end lies flush with one side wall of the recess.

As a consequence, the rear end of the pin 31 is in its full projected position (as seen in FIG. 4), at which position it is detected by means of photoelectric device 32 receiving radiation emitted by a small emitter 33.

Due to the fact that radiographic films are sensitive to part of the visible electromagnetic spectrum, the radiator 33 preferably is of the type emitting infrared radiation and the photoelectric device 32 is responsive to such radiation. The radiation may be transmitted by reflection as illustrated and the exterior end of the pin 31 shall then be polished in order to realize a high reflectivity.

Alternatively, the photodetecting circuit may be so designed that the exterior end of the pin intercepts the radiation emitted by the emitter 33 so that the presence or absence of radiation is sensed by the photoelectric device 32. The presence of radiation upon the radiation sensitive area of the photoelectric device 32, causes the latter to generate a control signal which after suitable amplification serves to energize the motor driving the gear-mechanism 29,30 illustrated in FIG. 2, so that the bar 27 starts its upward movement and the stack 14 is displaced into the magazine 13.

Figure 5:
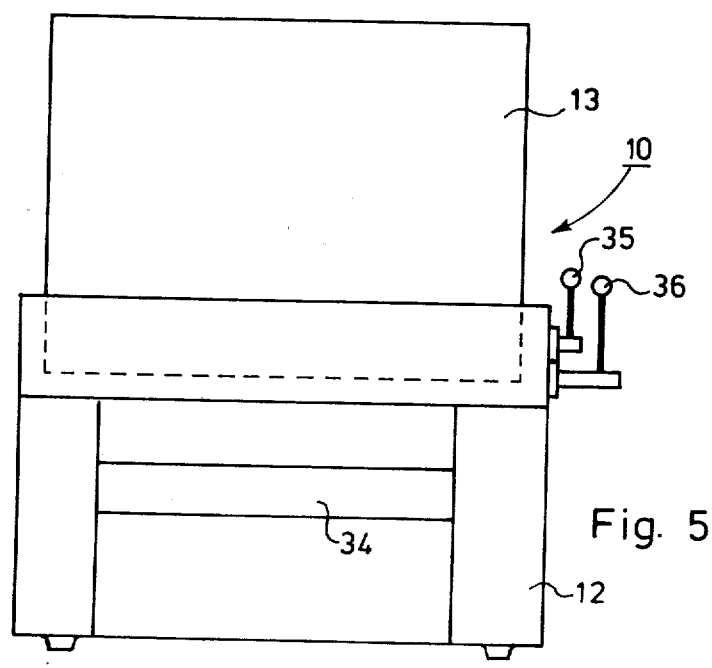
FIG. 5 is a front view of an intermediate unloader associated with an apparatus according to the invention.

In the front view of FIG. 5 an intermediate unloader incorporating an apparatus according to the invention is illustrated. As may be seen, the front of the unloader is provided with a cassette access door 34 capable of being light-tightly locked after a cassette to be unloaded has been inserted into it. The magazine 13 is removably secured in the rest of the apparatus.

The cassette access door 34 is sufficiently wide to accommodate the largest cassette size and it is not necessary to provide a separate unloader for each size.

On the right side of the housing 12 is provided a pair of handles 35 and 36 which operate the mechanism for guaranteeing the right sequence between the retaining movements of the stack retaining element 24 in the magazine 13 and the step of closing the light-trap provided at the bottom thereof.

Figure 6:
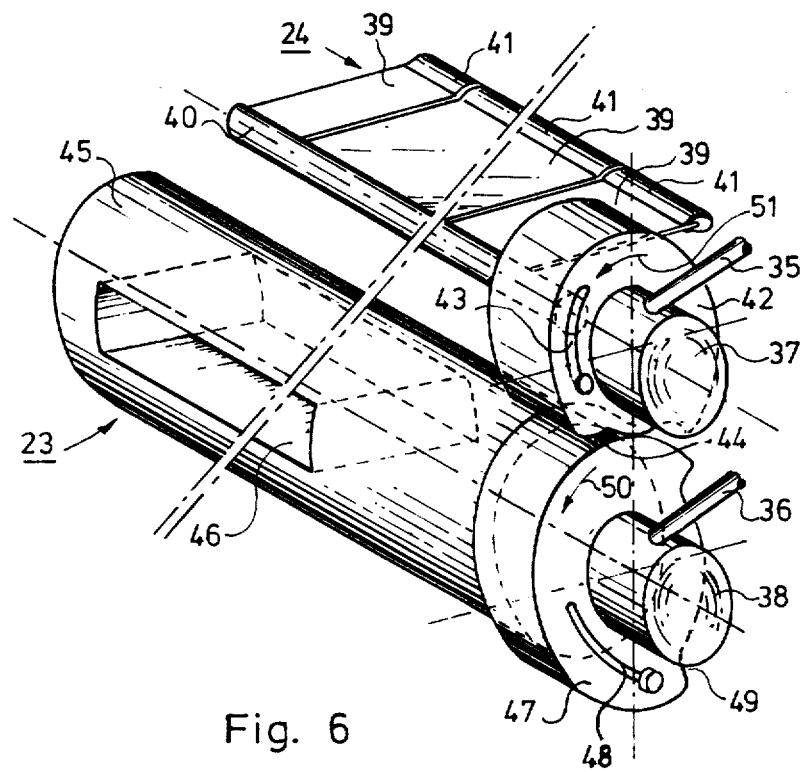
FIG. 6 represents a detail of the sequence controlling system for ensuring the right sequence of the sheet retaining and magazine closing operations.

This mechanism is illustrated more in detail in FIG. 6, being shown in the position where the stack of films is retained by stack retaining element 24 and the light-trap 23 is closed to screen the entrance opening of the magazine.

The stack retaining element 24 comprises a plurality of resilient blades 39 which have one end fixedly secured to a common shaft 40. The resilient blades 39 may be made of hard rubber, spring steel or an analogous material. The free extremity of the resilient blades 39 may be provided with a small strip or bead of silicone rubber 41 or an other material which is capable of being slightly compressed and which is sufficiently soft in order not to scratch the films to be retained. Further, the frictional coefficient of the material of the strip has to be high enough to prevent the film contacted thereby from slipping out of the magazine 13.

The shaft 40 is releasably (see also FIG. 7) coupled to shaft 37 which can be rotated by means of handle 35 (only partly shown in FIG. 6). Fixedly secured to shaft 37 is a cam 42 which is provided with an arcuate slot 43 cooperating with a pin in order to limit its rotation.

The cam 42 is formed as a cylinder with a peripheral recess. The purpose of this recess will be explained in the further course of the description.

The light-trap 23 is also in the form of a cylinder 45 through which a longitudinally extending radial slot 46 extends. The length of the slot is such that maximum size radiographic films can pass through it. This light-trap may be rotated between two positions: the light screening position as shown, and a position enabling unobstructed passage of the films into or out of the magazine 13 (see FIG. 1). This latter position is attained when the cylinder 45 is rotated over 90 degrees. The rotation can be performed by rocking the handle 36 and its associated shaft 38 over 90 degrees due to the fact that, just as for the film retaining element 24, the shaft 38 is releasably coupled (see FIG. 7) with cylinder 45. The shaft 38 is also provided with a cam 47 of analogous shape to cam 42, in a similar arcuate groove 48 and associated pin for limiting its rotation, and with a recess 49.

As will be easily seen by the skilled worker, the mechanism illustrated in FIG. 6 can only be used in a predetermined sequence. The steps are described hereinafter.

1st step: Shaft 38 is rotated in the sense of arrow 50 over 90 degrees. This must be done before shaft 37 can be rotated, because the part cam 47 on shaft 38 having the larger diameter rests in the recess 44 of smaller diameter in cam 42 associated with shaft 37. As a consequence of this rotation over 90 degrees, the slot 46 assumes a vertical position. Subsequently, shaft 37 is free to be rotated over 90 degrees in the sense of the arrow 51, which rotation is made possible by the displacement of recess 49 over 90 degrees so that the part of cam 42 with larger diameter fits into recess 49. As a consequence of rotating shaft 37, the stack retaining element 24 is standing upwardly.

The positions taken by the stack retaining element 24 and the light-trap 23 are assumed during the periods that radiographic films are fed into or dispensed from magazine 13 (see FIG. 1). This configuration will thus be adapted during the unloading of individual radiographic cassettes or during the unloading of the contents of the magazine 13 in an unloader connected to a processing apparatus.

2nd step: When the stack limit control mechanism illustrated in FIG. 4 is energized, as a consequence of the fact that the support 22 holds the maximum number of films or when a radiologist has carried out a series of exposures that he desires to develop the magazine 13 has to be taken out of the intermediate unloader 10 and transferred to an unloading station. First of all the radiographic films in the magazine are raised until their lower edge has disappeared far enough into the magazine. This is done by raising support 22 (see FIG. 1).

After lifting, the stack retaining element 24 is brought into operative position illustrated in FIG. 6 by rotating shaft 37 in the opposite direction of arrow 51. As a consequence the resilient members 39 bear against the stack of films contained in the magazine 13 and grip the stack in this position. Subsequently, shaft 38 is rotated in the opposite direction to arrow 50 and the interior of the magazine 13 becomes screened from ambient light. In this position the connections between the shafts 37 and 38 on the one hand and the shaft 40 and cylinder 45 on the other hand are released (see further) so that the magazine 13 may be withdrawn from module 12b.

3rd step: The unloading of the magazine 13 occurs by reversing the manipulations of the second step, so that at the unloading station the films remain retained until the light-trap 23 is in open position, after which the film stack is released and delivered to a dispensing mechanism which dispenses the films one by one in the same order they were originally stacked. This dispensing mechanism is amply disclosed in our co-pending applications referred to hereinbefore.

4th step: The empty magazine is returned to the intermediate unloader 10 (see FIG. 1) for unloading single radiographic cassettes. The positions of the stack retaining element 24 and of the light-trap 23 are identical to the ones assumed during the third step. Simultaneously, the connections between the shafts 37 and 38 on the one hand and the light-trap 23 and stack retaining element 24 on the other hand are restored.

Figure 7:
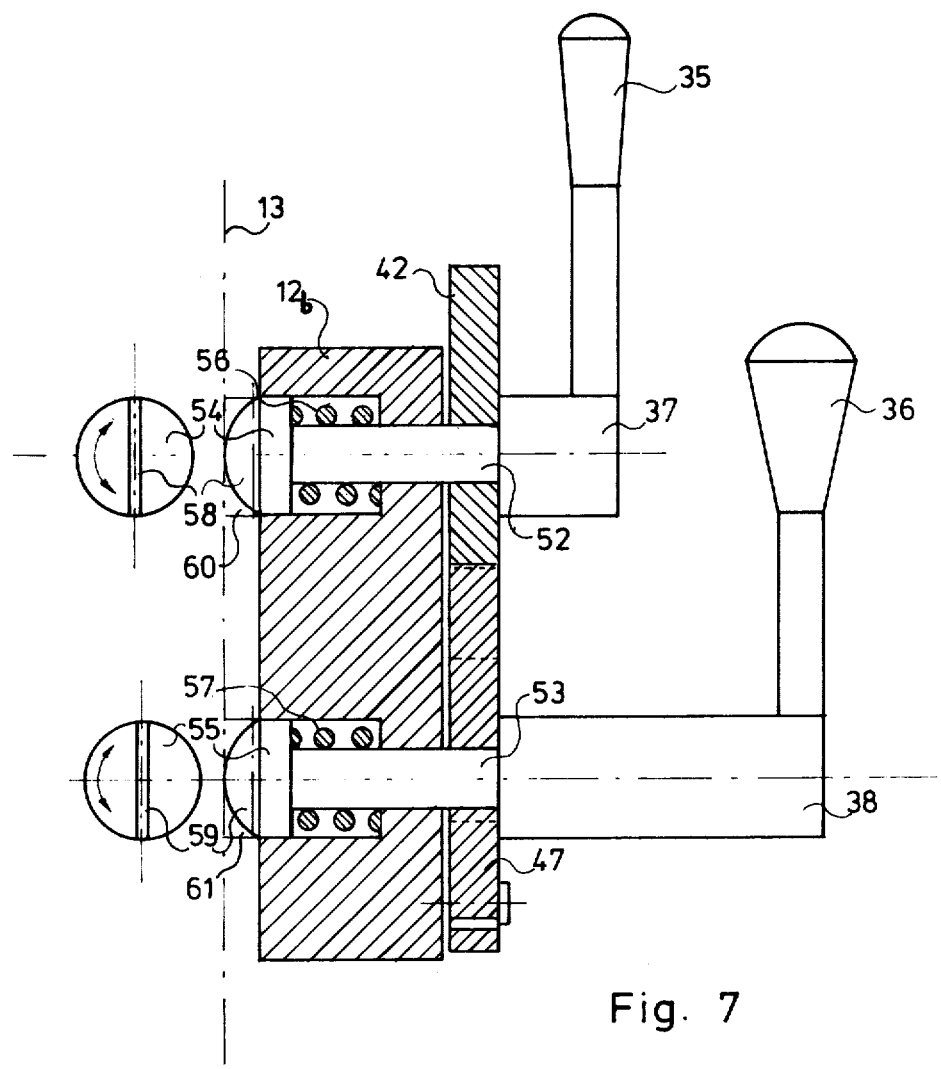
FIG. 7 represents how the magazine is releasably coupled to the rest of the apparatus shown in FIG. 1.

Finally, FIG. 7 illustrates how the magazine 13 (only schematically indicated) is releasably coupled to the mechanism for operating the light screen and the stack retaining element. As can be seen the shafts 37,38 are each fixedly connected with a small resiliently biased shaft 52, 53 bearing at its interior end a small disk 54, 55 which is resiliently supported in an associated recess with the help of springs 56, 57. Perpendicularly carried on the exposed face of the disks 54,55 is segment-like protrusions or tongues 58, 59 that mate with a corresponding groove provided in the adjacent extremity of the shaft 40,45.

So, when the segment-like protrusions 58,59 are arranged in vertical positions as illustrated into the views of FIG. 7, free removal of the magazine 13 from the module 12b is possible since all conditions as to light-screening and film retaining are fulfilled.

When, on the contrary, the handles 35 and 36, and the segment-like tongues 58,59 and their associated grooves are rotated to a horizontal position, the magazine 13 becomes fixedly secured to module 12b. It wil be clear that only one of the tongues 58 or 59 need be in a horizontal position in order to secure the magazine 13 against removal from module 12b.

We claim:

1. A sheet-receiving and storage apparatus comprising a housing having an entrance opening via which sheets can be fed one by one into its interior, an open-bottomed magazine releasably connected to said housing via said open bottom for receiving sheets from said housing in the same sequence and storing them as a stack, a sheet advancing mechanism for causing sheets entering said housing to advance to a rest position with their upper portions within said magazine and their trailing end portion extending through said open bottom into said housing, sheet supporting means normally disposed in a position underlying the trailing edges of a plurality of said sheets in said rest position and thereby supporting a stack of such sheets in face to face relationship in said rest position, a mechanism for elevating said sheet supporting means upwardly from its normal position thereby to raise the supported sheet stack bodily into the magazine, stack retaining means operative for retaining the raised stack of sheets in the magazine against the action of gravity after retraction of said sheet supporting means to its normal position, and closure means for light-tightly closing the bottom of said magazine after such retraction.

2. An apparatus according to claim 1 in which said sheet supporting means is arranged relative to said sheet advancing mechanism so that the trailing end of a sheet being advanced by said advancing means is delivered to said supporting means.

3. An apparatus according to claim 1 in which said sheet supporting means is in the form of a bar having a longitudinally extending channel sufficiently wide to receive the lower edges of a predetermined number of sheets in a stack.

4. An apparatus according to claim 1, incorporating detecting means responsive to the presence of a predetermined number of sheets supported by said supporting means to provide an indication thereof.

5. An apparatus according to claim 4, in which said detecting means comprises an element mounted on said magazine and adapted to move relative thereto as a function of the number of sheets present within the magazine, and a switching device responsive when said element reaches a limit position for arresting the feeding of said sheets.

6. An apparatus according to claim 5, in which said switching device is in the form of a radiation emitter and an associated radiation sensitive element mounted to receive radiation from said emitter when said detector element is in said limit position.

7. An apparatus according to claim 6, in which said element when in its limit position is adapted to reflect the radiation emitted by said emitter and said radiation sensitive element monitors the presence of said reflected radiation.

8. An apparatus according to claim 1, in which the stack retaining means is in the form of a plurality of pivotally mounted resilient members, adapted to be pivoted into pressing engagement with a stack of said sheets to grip the same within said magazine.

9. An apparatus according to claim 8, in which said resilient members contact said sheet stack at one end and said end comprises a layer of a deformable material.

10. An apparatus according to claim 1, in which said closure means is in the form of a slotted roller adapted in one position to allow passage of said supporting means and the sheet supported thereon, while preventing any light penetration in another position.

11. An apparatus according to claim 1, incorporating a sequence interlocking mechanism comprising intermeshing cam members associated with said stack retaining means and said closure means so as to preclude operation of said sheet retaining means until said closure means is in closed position.

12. An apparatus according to claim 1, in which said sheet supporting means lie closely adjacent to said sheet advancing mechanism so that when said sheet trailing end clears said sheet advancing mechanism it falls by gravity into said sheet supporting means.

13. An apparatus according to claim 12, in which said sheet advancing mechanism is in the form of a pair of transport rollers forming a nip and the one of said transport rollers which lies most closely to said sheet supporting means contacts the trailing edge of said sheet on emerging from said nip and subsequently displaces the same around the periphery of said one transport roller.

14. An apparatus according to claim 13, in which the said one of said transport rollers upon rotation exerts a displacing force on said sheet edge of such magnitude as to overcome the mutual frictional force with the next sheet of the stack, so that said sheets in the stack are gradually urged away from said transport roller.

* * * * *